(12) United States Patent
Lachenmeier

(10) Patent No.: US 11,052,500 B2
(45) Date of Patent: Jul. 6, 2021

(54) PLATFORM FOR ROBOTS

(71) Applicant: EASYROBOTICS APS, Sonderborg (DK)

(72) Inventor: Per Lachenmeier, Sonderborg (DK)

(73) Assignee: EASYROBOTICS APS, Sønderborg (DK)

( * ) Notice: Subject to any disclaimer, the term of this patent is extended or adjusted under 35 U.S.C. 154(b) by 272 days.

(21) Appl. No.: 15/740,759

(22) PCT Filed: Jun. 21, 2016

(86) PCT No.: PCT/EP2016/064326
§ 371 (c)(1),
(2) Date: Dec. 28, 2017

(87) PCT Pub. No.: WO2017/001248
PCT Pub. Date: Jan. 5, 2017

(65) Prior Publication Data
US 2018/0185974 A1 Jul. 5, 2018

(30) Foreign Application Priority Data
Jun. 29, 2015 (DE) .......................... 102015110453.9

(51) Int. Cl.
*B23Q 7/14* (2006.01)
*B23Q 9/00* (2006.01)
*B25J 9/00* (2006.01)

(52) U.S. Cl.
CPC .............. *B23Q 7/1442* (2013.01); *B25J 9/00* (2013.01); *B25J 9/0093* (2013.01); *B25J 9/0096* (2013.01)

(58) Field of Classification Search
CPC .......... B25J 9/00; B25J 9/0093; B25J 9/0096; B23Q 7/1442
See application file for complete search history.

(56) References Cited

U.S. PATENT DOCUMENTS 5,438,647 A 8/1995 Nagamatsu et al.
7,311,488 B2 * 12/2007 Park .................. H01L 21/67724
414/663

(Continued)

FOREIGN PATENT DOCUMENTS

DE 42 11 835 A1 10/1992
DE 198 05 206 A1 8/1999

(Continued)

*Primary Examiner* — Saul Rodriguez
*Assistant Examiner* — Ashley K Romano
(74) *Attorney, Agent, or Firm* — BakerHostetler

(57) ABSTRACT

A feeding system for feeding workpieces to a device by means of a robot comprises a feeding station and at least one transport carriage, wherein the feeding station comprises a robot fastening section and is designed that a workpiece holder can be held in the feeding station in a holding position defined in relation to the robot fastening section from which a robot attached to the robot fastening section can grasp the workpieces. The transport carriage also has at least one holding device for holding a workpiece holder in a first holding position. The feed system comprises a coupling section wherein the transport carriage can be coupled to the feeding station using a coupling device in such a way that a workpiece holder held in the transport carriage in the first holding position is brought into the receiving position after the transport carriage has been coupled with the coupling section. A method for feeding workpieces to a device and the use of a feed system is provided.

15 Claims, 12 Drawing Sheets

(56) References Cited

U.S. PATENT DOCUMENTS

| | | | |
|---|---|---|---|
| 7,942,619 B2 * | 5/2011 | Hashimoto | H01L 21/67766 414/217 |
| 8,657,310 B2 * | 2/2014 | Pan | H01L 21/6773 280/47.35 |
| 9,190,304 B2 * | 11/2015 | MacKnight | H01L 21/67736 |
| 2003/0012626 A1 | 1/2003 | Aggarwal | |

FOREIGN PATENT DOCUMENTS

| | | |
|---|---|---|
| DE | 10 2005 009283 A1 | 8/2006 |
| EP | 0 673 711 A1 | 9/1995 |
| WO | 2007/089269 A2 | 8/2007 |
| WO | 2013/087554 A1 | 6/2013 |

* cited by examiner

PLATFORM FOR ROBOTS

CROSS-REFERENCE TO RELATED APPLICATIONS

This application is a National Stage of International patent application PCT/EP2016/064326, filed on Jun. 21, 2016, which claims priority to foreign German patent application No. DE 10 2015 110 453.9, filed on Jun. 29, 2015, the disclosures of which are incorporated by reference in their entirety.

FIELD OF THE INVENTION

The present invention relates to a feed system for feeding a device with workpieces by means of a robot. The feed system comprises a feeding station and at least one transport carriage, wherein the feeding station comprises a robot fastening section and is formed such that a workpiece holder can be held in it in a receiving position defined with respect to the robot fastening section. A robot attached to the robot fastening section can grip the workpieces from the receiving position. The transport carriage also has at least one holding device for holding a workpiece holder in a first holding position. Further, the present invention relates to a method for feeding a device and the use of a feed system.

BACKGROUND

Feed systems are used for automated placement of workpieces in a device. This can occur, for example, in an industrial production process or a logistics process. Device within the meaning of this application is understood, for example, as processing machines such as fully automated lathes or milling machines (CNC machines). But logistic devices such as pallets or other packaging units used for transporting workpieces should also be comprised. Feed systems thus also make it possible to carry a workpiece to a next processing machine after its processing. Feed systems are accordingly an important element to realizing an automation of the production and logistics processes.

Relative to a manual feeding of devices, the use of a feed system offers the advantage that compared to a manual insertion or removal of the workpieces into and from the device the repetition accuracy and frequently also the timing of the individual work steps can be shortened. As a result, manual labor can be saved through the use of feeding systems. Along with the increase in production speed, this leads to a significant reduction in the unit cost of a single workpiece in a production or logistics process. By using feed systems, it is accordingly possible to produce economically even in countries with a high wage level through a rising degree of automation.

A disadvantage of the previously existing feed systems is that they still require a high degree of manual labor to insert the workpiece holder with the workpieces into the feed system or, if the inset is to be automated, a very expensive design is required. The reason for this is that each of the known feed systems must be individually adapted to the characteristics of the respective workpiece such as size, shape and weight. This is required so the feed system can reliability insert a workpiece into the device and remove it from it, and transport it to the next device. A change of the good produced, and thus a replacement of the previously produced workpieces by others, thus require complicated conversion measures and adjustments to the feed systems in the production process. Accordingly, the known feed systems are only suitable for use in large-scale production in which, over a long period in a given production step, only identical workpieces are machined so that changes to the feed system are not required.

Compared to large-scale production, the good produced in small or very small series often changes within a short time. The result is either the need for costly refitting of the feed system due to the product change or choosing a feed system in which the workpieces are still inserted manually. Consequently, in the production of small and very small series the insertion and removal of workpiece holders in the feeding system is either done with a high proportion of manual labor or entails high retooling costs. This, in turn, greatly raises the production costs for manufacturing small and very small series since participation in the productivity increases of automated production is not possible.

SUMMARY OF THE INVENTION

The present invention therefore is based on the object of providing a feed system that can be quickly, flexibly, and inexpensively adapted to changed workpieces and production processes.

The object is achieved with a feed system according to claim 1, a method for feeding a device according to claim 16, and use of the invention's feed system according to claim 20. Advantageous refinements are described in the dependent claims.

The invention's feed system is distinguished from the feed systems described above and known from the prior art by the feeding station comprises a coupling section through which the transport carriage can be coupled with the feeding station by means of a coupling device such that a workpiece held in the transport carriage in the first holding position is brought to the receiving position after the coupling of the transport carriage with the coupling section. The feed system makes it possible, in combination with a robot mounted on the robot fastening section, to automatically deliver workpieces to a device and at the same time be cost-effective in manufacturing small and very small series. Feed systems are comprised by the invention that can be delivered with or without a robot mounted on the robot fastening section of the feeding station. It is customary that the invention's feeding station is sold without a robot mounted on the robot fastening section, since this is frequently selected only in accordance with the customer's requirements and mounted by the customer on the feeding station after the delivery. In addition, the feed system can also be delivered to the customer at any time with a robot already mounted on the robot fastening section.

It is characteristic of the feed system that one or more transport carriages are used for transporting the workpieces. In its simplest embodiment, these can be pushed manually. This allows the workpieces to be easily transported from one feeding station to another whereas the time-consuming feeding of the device is automated. Suitable transport carriages are, for example, transport carriages in the size of a quarter-euro pallet. But larger or smaller transport carriages are also conceivable, e.g. if the dimensions of the workpieces or the desired capacity necessitate this.

Use of a standardized holding device on the transport carriage allows workpiece holders to be inserted into the transport carriage for different workpieces. The feed system can be easily refitted for transporting different workpieces through the easy interchangeability of the workpiece holder in the transport carriage. On the transport carriage, the workpiece holder in the holding device is stored in the holding position. This prevents an unintended shifting of the workpiece holder or the workpiece itself situated on it when the workpieces are removed from the workpiece holder. In a simple design, the workpiece holder itself can be a box in which the workpieces are placed as either bulk goods or ordered. In a more refined design, with expensive or sensitive workpieces the holder is made such that it also holds one or more workpieces in a particular position. This assures a more protective transport of the workpieces.

The transport carriage is pushed into the coupling section of the feeding station and is detachably connected with the coupling section by means of a coupling device. A coupling device as defined by this application is to be understood as a device that connects the transport carriage in a particular position with the coupling section and/or prevents the transport carriage from rolling away from the coupling section. The coupling device is also designed such that after a disconnection of the coupling and recoupling the transport carriage in the coupling section occupies the same position as before. The coupling device thus causes the workpiece holder on the transport carriage after the coupling to be situated immovably with respect to the feeding station, especially relative to the robot fastening section, and deposited reproducibly in a defined receiving position. A receiving position is to be understood as the position of the workpiece holder in which the robot mounted on the robot fastening section can receive the workpieces placed on the workpiece holder and also deposit workpieces on the workpiece holder. Since after the coupling of the coupling section with the transport carriage the workpiece holder is already in the defined receiving position, a manual transfer of the workpiece holder to the receiving position is also eliminated.

Since the position of the workpiece holder relative to the robot fastening section is reproducible, the workpieces can be taken one after the other by the robot from multiple similar workpiece holders and workpieces can also be set on the workpiece holder. Given similar workpiece holders, programming the respective position of the workpiece holder and the workpieces located on it in the robot is only necessary once. The coupling of the transport carriage with the coupling section means the holding position becomes the receiving position so that it can be produced in series easily.

It is advantageous if the coupling section comprises at least one lateral guide, preferably two lateral guides, for the transport carriage. A suitable guide is, for example, a rail, a frame portion, or also a wall arranged on the side along which the transport carriage is guided when the transport carriage is pushed to the coupling section. A lateral guide greatly facilitates coupling between the transport carriage and the coupling section, since the transport carriage is guided by the lateral guide in the coupling section.

In a preferred embodiment of the feed system, the coupling section comprises at least one end-side stop. An end-side stop greatly facilitates coupling between the transport carriage and the coupling section, since the transport carriage can be pushed forward to the end-side stop on the coupling section.

Preferably, the at least one lateral guide comprises at least one lateral guide rail and/or at least one lateral guide roller. The lateral guide rail and/or lateral guide roller faces the coupling section arranged on the lateral guide. The lateral guide rail is also preferably made of a material that reduces friction when the transport carriage is pushed into the coupling section. A plastic is preferably used. To reduce this friction, at least one lateral guide roller can be arranged rotatably, preferably ball bearing mounted, on the lateral guide. The lateral rollers likewise serve the transport carriage as a guide when this is brought into the coupling section in a receiving position. Along the at least one lateral guide rail and/or at least one lateral guide roller, a transport carriage can be pushed into the coupling section almost without play relative to the lateral guide rail and/or lateral guide roller without rubbing against the lateral guide or tilting. This allows the transport carriage to be coupled with the coupling section with a particularly high repetition accuracy in a receiving position relative to the robot fastening section.

In this connection, it is appropriate if the lateral guide rail and/or the at least one lateral guide roller is designed such that the transport carriage is elevated from the bottom when being pushed into the coupling section. This has the advantage that the workpieces or the workpiece holder are always at the same height relative to the robot fastening section. A height offset caused by, for example, metal filings or waste lying on the bottom can be avoided. It is conceivable that a plurality of guide rollers are used for this, at least partially arranged in an ascending angle to each other.

Should one or two lateral guides also be present in addition to the end-side stop, the movement possibilities of the transport carriage in the coupling section are further restricted by the one or two lateral guides and the end-side stop, so that after the transport carriage is pushed into the coupling section only a rolling of the transport carriage out of the coupling section must be prevented. The result is that the coupling device can be designed particularly simply so that the workpiece holder is located in the receiving position. Correspondingly, the workpiece holder is fixed particularly effectively in a reproducible receiving position defined with respect to the robot fastening section by one or two lateral guides and/or the end-side stop element in connection with the coupling device.

It is effective for the configuration of the feed system if the coupling device is provided on the coupling section of the feeding station and/or on the transport carriage. For example, a parking brake fastened on the transport carriage can serve as a coupling device according to the invention. A locking mechanism or the like is also conceivable as coupling device, which prevents the transport carriage from rolling out of the coupling section. Comparable to a lock bolt, such a coupling device can be provided on at least one lateral guide. Furthermore, combinations are also conceivable in which both the coupling section and the transport carriage comprise a coupling device preventing a movement of the transport carriage relative to the feeding station. Such a coupling device can be, for example, a clutch and a corresponding counterpart. The clutch is provided, for example, on the coupling section and the counterpart on the transport carriage, or vice versa. This can particularly effectively assure that the workpiece holder is held in a receiving position defined relative to the robot fastening section.

It is advantageous for the feed system if the transport carriage comprises a plurality of holding devices arranged at different heights of the transport carriage for holding the workpiece holders in different holding positions in the transport carriage. Holding devices can be, for example, rails arranged horizontally on the transport carriage on which the workpiece holder is positioned in the holding position on the transport carriage. Depending on the workpiece size, these can thus be positioned in the transport carriage such that after the coupling of the transport carriage with the coupling section the workpieces are in an optimal receiving position. An optimal receiving position is to be understood as one in which the workpieces are positioned neither too high nor too low for a reception by the robot. The possibility of arranging the workpieces in different holding positions on the transport carriage allows the feed system to be very easily adapted to workpieces of different size.

In one embodiment of the feed system, the feeding station is designed such that a workpiece holder is brought directly into the receiving position by the coupling process with the transport carriage. In this simplest embodiment of the feed system, a workpiece holder placed in the holding position on the transport carriage is situated in the defined receiving position after the coupling of the transport carriage with the coupling section.

In a further development of the feed system, the feed station is designed so that a workpiece is brought indirectly into the receiving position by the coupling procedure with the transport carriage. An indirect bringing in the context of this application after the coupling of the transport carriage to the coupling section in particular is understood as a horizontal and/or vertical movement of the workpiece holder into the receiving position.

The feeding station advantageously comprises a loading device with which a workpiece holder can be brought from a holding position in the transport carriage into the receiving position in the feeding station. Such a device allows workpiece holders to be removed from the transport carriage at different heights and then brought into the receiving position. This allows the workpiece holder to be brought into an optimal receiving position.

It is advantageous for the design of the feed system if the loading device is designed such that it can raise, lower, push and/or pull a workpiece holder. For example, the workpiece holder can be removed horizontally from the holding position on the transport carriage and then brought vertically into the receiving position. Since this also makes it possible to remove workpiece holders from the transport carriage at different heights and insert them into it, transport carriages with multiple workpiece holders arranged at different heights on the transport carriage can also be correspondingly coupled with the coupling section and the workpiece holders brought into a receiving position one after the other. This makes it possible to automatically unload transport carriages loaded with a plurality of workpiece holders, feed the device with the workpieces, or reload on the transport carriage a workpiece holder loaded with or without workpieces.

A further development is to design the loading device as an independent loading module that can be attached to the feeding station, preferably directly on the coupling section of the feeding station. The independent load module is shaped such that it can also be arranged in the existing coupling section of a feed station, so that a functional unit between the loading station and the independent load module is produced. In this way, existing loading systems can be quickly and easily retrofitted with a loading device if needed.

The load module advantageously comprises a coupling section, preferably corresponding to the coupling section of the feeding station, for coupling a transport carriage. The load module's coupling section has the same features as the coupling section of the feeding station so that a transport carriage can be coupled with the load module in the same way as with the feeding station itself. In this way the load module can be integrated into the feed system particularly easily without having to make changes to the transport carriage, feeding station, or workpiece holder.

In a further development, the feeding station comprises a plurality of coupling sections. Preferably, at least one more coupling section is arranged in addition to the coupling section already present. By this mean, a workpiece holder can likewise be situated in a defined receiving position to the robot fastening section in a holding position of a transport carriage coupled with another coupling section. Such an arrangement makes it possible, for example, that with the aid of the feed system workpieces can be received from a workpiece holder, placed in the device, and then brought to another workpiece holder. This is particularly advantageous if the shape of the workpiece has changed in the device such that the workpiece can no longer be set on the original workpiece holder.

As a further refinement, the feeding station comprises at least one more robot fastening section suitable for fastening of another robot. In such an arrangement, a device can be quickly supplied individual workpieces by the feed system so that production speed is raised. At the same time, it is possible to simultaneously feed the device multiple workpieces, including different ones. This can happen, for example, if multiple workpieces in the device are joined together into a new workpiece.

It is advantageous if the coupling section comprises an insertion device for workpiece holders. The insertion device can be designed, for example, in the form of two support arms. With their help, after the coupling of the transport carriage with the coupling section a workpiece holder can be subsequently positioned in a holding position on the transport carriage. At the same time, it is also possible to remove a workpiece holder from the holding position from a transport carriage coupled with the coupling section. Such a device makes it possible to also remove individual workpieces from the transport carriage in the coupled condition, e.g. for a quality control, and insert another workpiece holder into a holding position. It is also possible to load, for example, delivered workpieces on the transport carriage manually.

The method for feeding a device with workpieces by means of a robot comprises the following procedural steps:

a) loading of a transport carriage with at least one workpiece holder and at least one workpiece, b) movement of the transport carriage to a feeding station, c) coupling of the transport carriage with a coupling section of the feeding station.

The method for the feeding is distinguished from known methods by the fact that d) directly after the coupling in procedural step c) the at least one workpiece is removed by the robot and the device is thus fed by the robot.

Procedural step a) can also be done in a further feeding station by a robot and/or manually. Accordingly, the loading of the transport carriage with workpiece holders and workpieces on them in a holding position can be done both automated and manually. The feed system can be adapted especially flexibly to the given economic conditions of an order.

Preferably, the method can be performed in the opposite sequence for feeding a transport carriage. Workpieces can be taken out of the device automated and set back on the workpiece holder of the transport carriage coupled with the coupling section. After the transport carriage is decoupled, it can, for example, be moved further to another feeding station with the workpiece holder and workpieces situated on it.

It is advantageous that the method occurs with interposition of a movement of at least one workpiece holder from a holding position to a receiving position by a loading device. Movement here is understood as, for example, a horizontal and/or vertical movement of the workpiece holder with or without workpieces situated on it. The interposition of a movement can also bring workpiece holders into a receiving position that are not directly in the defined receiving position after the coupling of the transport carriage with the coupling section. This is particularly advantageous if the transport carriage is loaded with multiple workpiece holders in different holding devices. This is advantageous because the transport carriage's capacity can be increased.

The invention further comprises a use of a feed system according to the invention for feeding a device. In production and logistic processes in particular, a feed system according to the invention is used to feed a device with workpieces, for example for their processing. Workpieces can also be easily transported from one device to another.

BRIEF DESCRIPTION OF THE DRAWINGS

The invention will be explained in more detail based on embodiments described in the drawings. Schematically shown here are.

DETAILED DESCRIPTION

Figure 1:
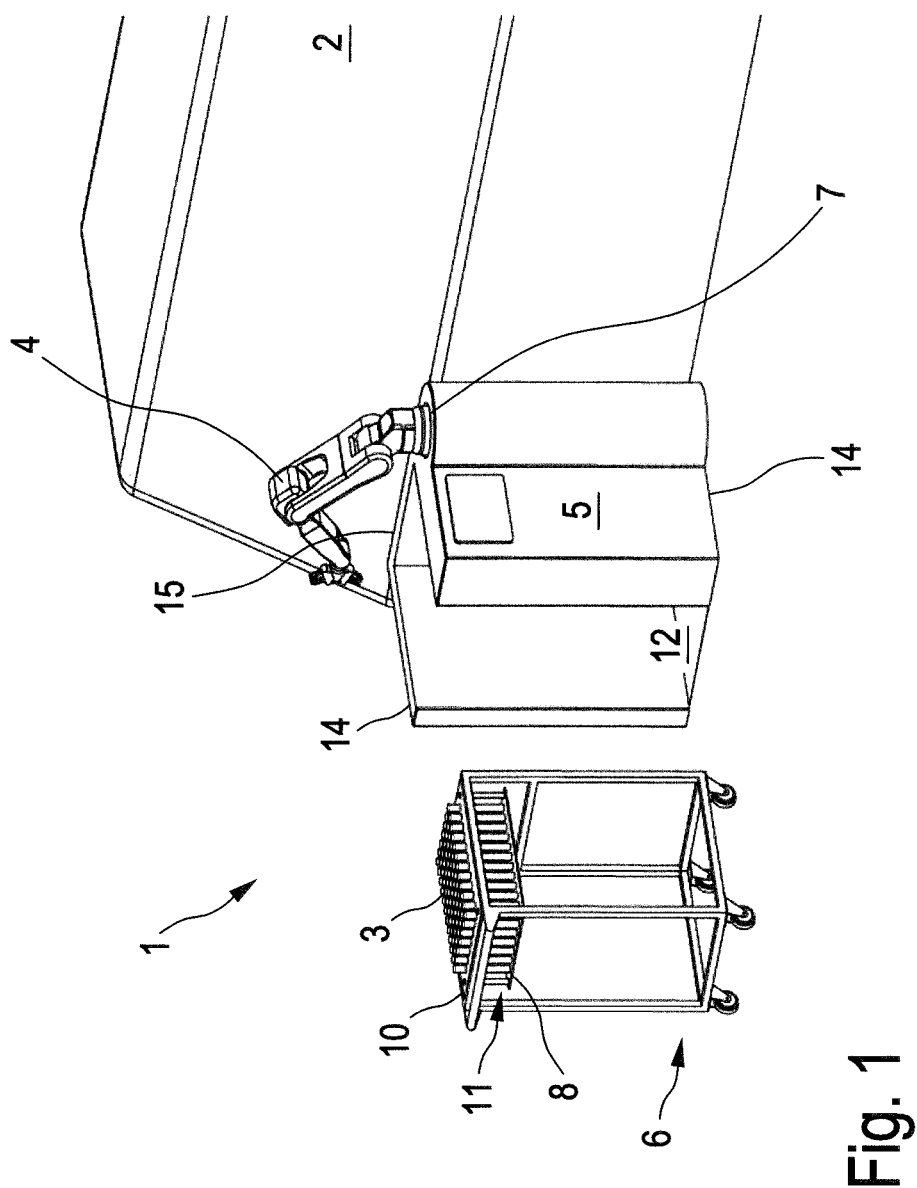
FIG. 1 a first embodiment of a feed system before the coupling of a transport carriage with a coupling section.

FIG. 1 shows a feed system 1 according to the invention, consisting of a feeding station 5 and a transport carriage 6. The feeding station 5 comprises a robot fastening section 7. Feeding station 5 further has a coupling section 12 and two lateral guides 14, as well as an end-side stop 15. A robot 4 is also mounted on the robot fastening section 7. Further, in FIG. 1 the transport carriage 6 is shown before it is coupled with the coupling section 12. The transport carriage 6 has a holding device 10 in which a workpiece holder 8 is in a holding position 11. A plurality of workpieces 3 are arranged on the workpiece holder 8. The feed system 1 is further positioned next to a device 2 in the form of a production machine.

Figure 2:
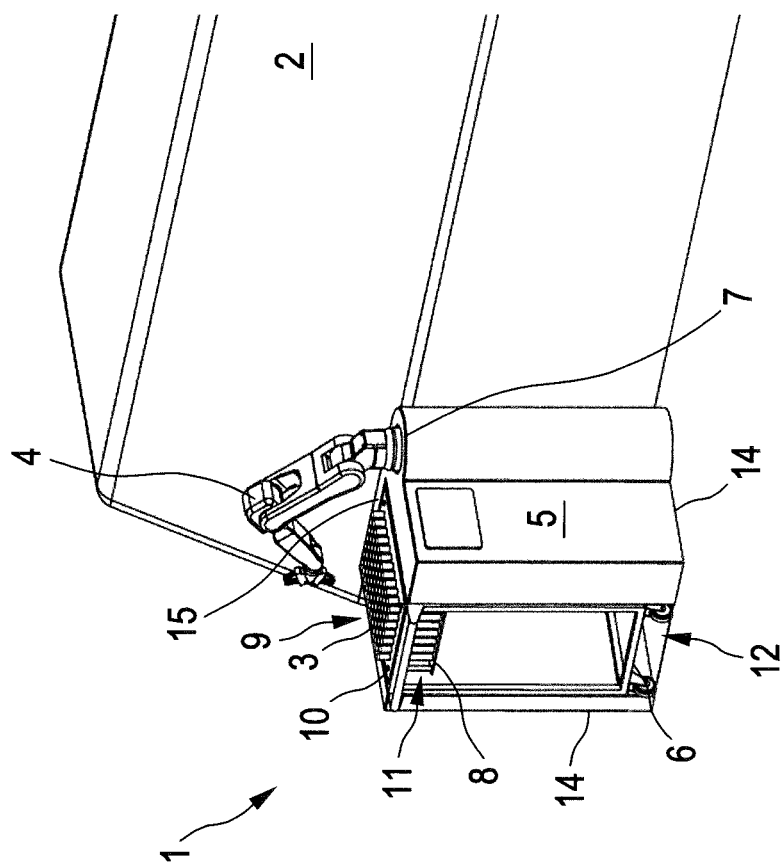
FIG. 2 the first embodiment of the feed system with a transport carriage coupled in the coupling section.

In FIG. 2 is shown the feed system 1 depicted in FIG. 1, where in contrast to FIG. 1 the transport carriage 6 is coupled with the coupling section 12 of the feeding station 5. In addition, the workpiece holder 8 fixed in the holding device 10 of the transport carriage 6 with a plurality of workpieces 3 located on it is in a receiving position 9 relative to the robot fastening section 7 and the robot 4 mounted on it.

Figure 3:
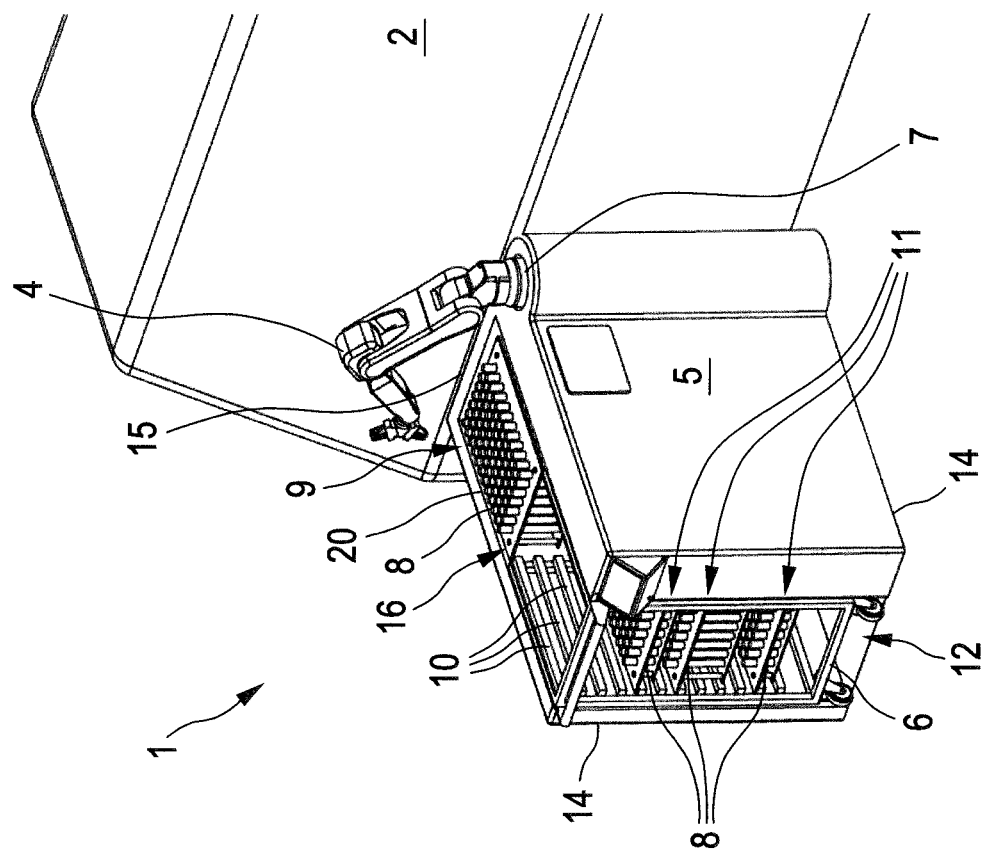
FIG. 3 a second embodiment of the feed system with integrated loading device.

A second embodiment of the feed system is illustrated in FIG. 3. This shows a feeding station 5 with a loading device 16. The transport carriage 6 is also coupled with the coupling section 12. The coupling portion 12 of the feeding station 5 is formed by two lateral guides 14 and one end-side stop 15. A robot 4 is mounted on the robot fastening section 7, where the robot fastening section 7 corresponds to that of the first embodiment. The transport carriage 6 coupled with the coupling section 12 has a plurality of holding devices 10, arranged in the form of support rails horizontally at different heights on the transport carriage 6. In three of the holding devices 10 are three workpiece holders 8 at different heights each in a holding position 11 in the transport carriage 6. Another workpiece holder 8 is positioned by the loading device 16 in a receiving position 9 relative to the robot fastening section 7, so that the robot 4 can receive the workpieces 3 arranged on the other workpiece holder 8. The feed system 1 is further positioned next to a device 2 in the form of a production machine.

Figure 4:
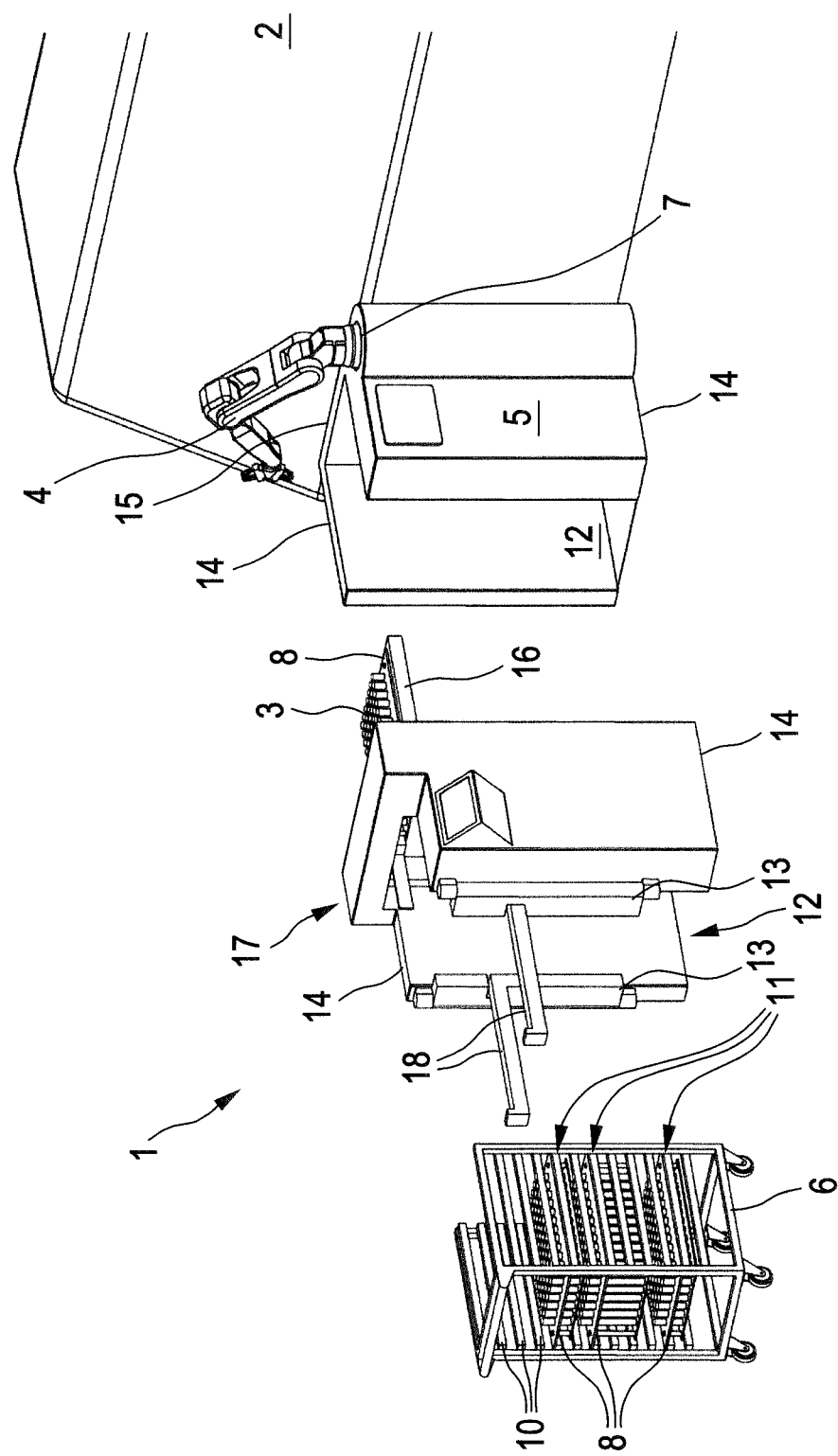
FIG. 4 a third embodiment of the feed system with a retrofittable load module, before the retrofit.

In FIG. 4 a feed system 1 is shown as a third embodiment consisting of a feeding station 5, a transport carriage 6, and a load module 17. FIG. 4 shows the load module 17 and the feeding station 5 before these are joined into one unit. The feeding station 5 corresponds to the feeding station according to the first embodiment. The load module 17 consists of two lateral guides 14. The loading device 16 is arranged between the lateral guides 14. To illustrate the operating principle of the loading device 16, a workpiece holder 8 with workpieces 3 is set on the loading device 16. The load module 17 also has on the lateral guides 14 a coupling device 13 and one insertion device 18 each. The transport carriage 6 depicted has multiple holding devices 10, distributed over the height of the transport carriage 6 mounted on the transport carriage 6. Three workpiece holders 8 are arranged in a holding position 11 in the transport carriage 6. The feed system 1 is further positioned next to a device 2 in the form of a production machine.

Figure 5:
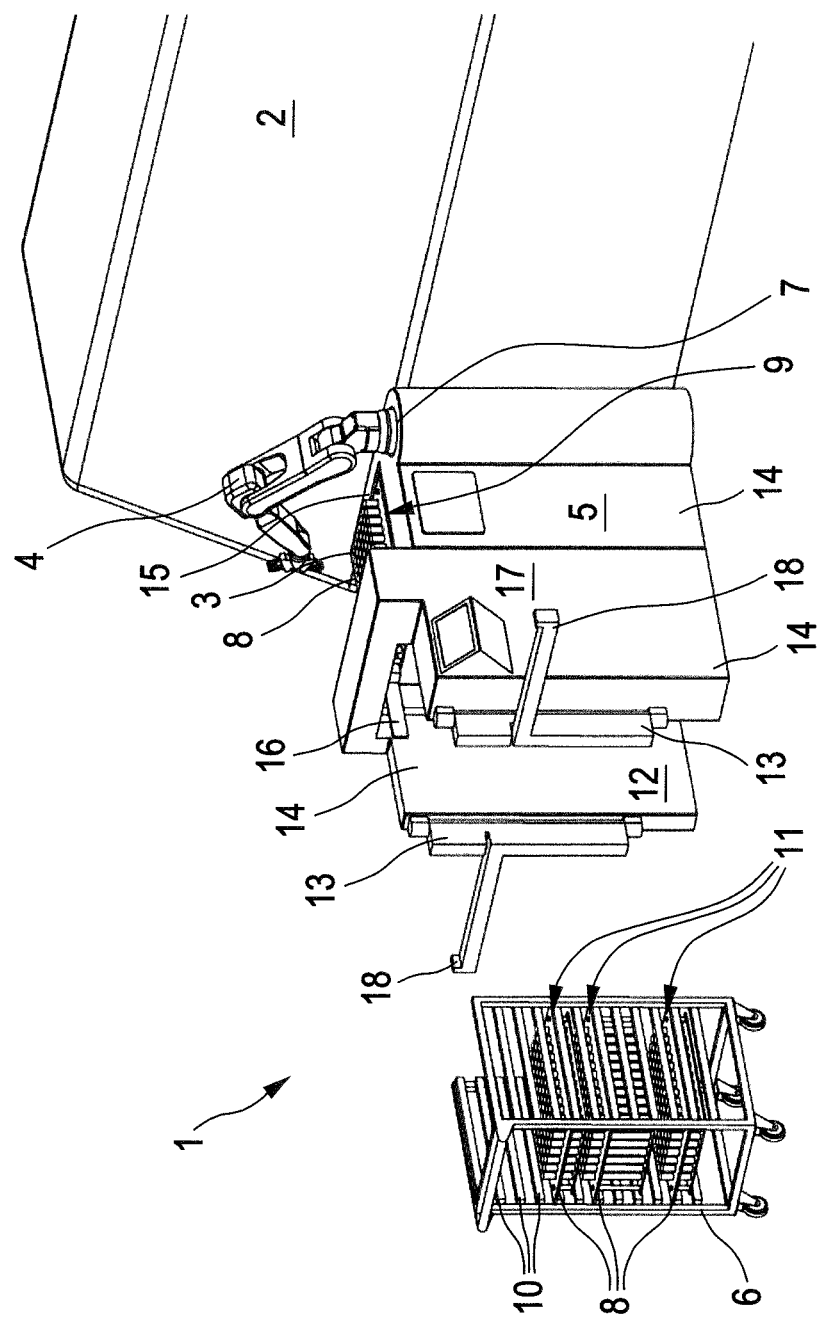
FIG. 5 the third embodiment of the feed system with the retrofitted load module, before the coupling of the transport carriage.

In FIG. 5 is shown the feed system 1 in the variant shown as the third embodiment, consisting of a feeding station 5, load module 7, and transport carriage 6. In contrast to FIG. 4, in FIG. 5 the feeding station 5 and load module 17 are already assembled to form a functional unit, i.e. the feeding station 5 is retrofitted with a loading device 16. The feed system 1 shown in FIG. 5 further shows the transport carriage 6 before it is coupled with the coupling section 12 of the retrofitted feeding station 5. It can be seen that a workpiece holder 8 with multiple workpieces 3 is in a receiving position 9 relative to the robot fastening section 7, so that the robot 4 mounted on the robot fastening section 7 can remove workpieces 3. In addition, two coupling devices 13 are situated in an open position in which the transport carriages 6 can be pushed into the coupling section 12.

Figure 6:
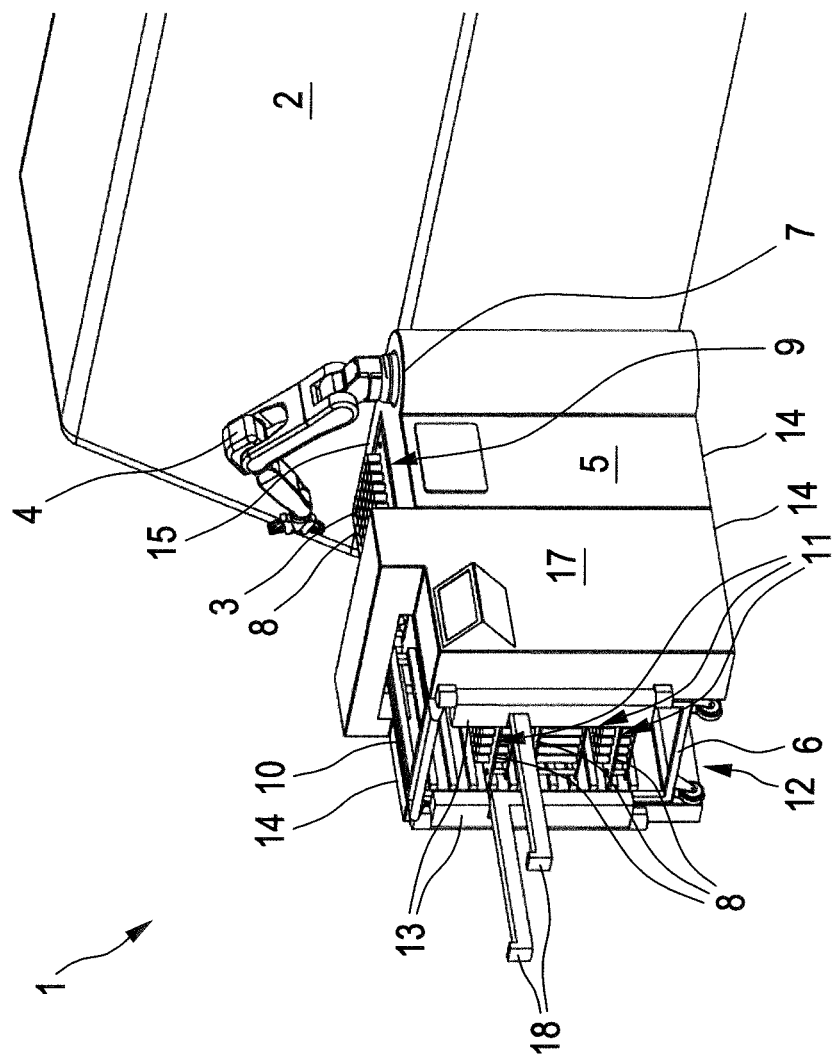
FIG. 6 the third embodiment of the feed system with the retrofitted load module and with a coupled transport carriage.

In FIG. 6 is likewise shown the feed system 1 in the variant shown as the third embodiment. In contrast to FIG. 5, in FIG. 6 the transport carriage 6 is coupled with the coupling section 12 of load module 17. For this the two coupling devices 12 are in a closed position that prevents the transport carriage 6 rolling out of the coupling section 12.

Figure 7:
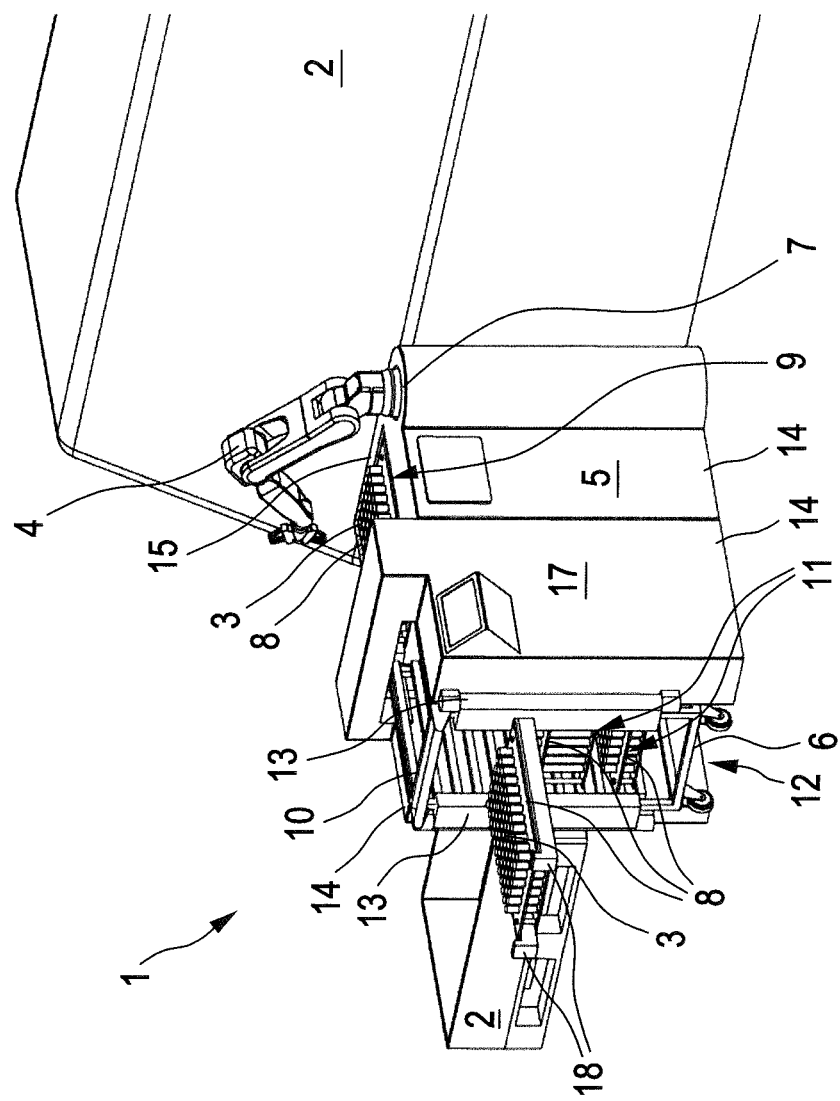
FIG. 7 the third embodiment of the feed system with manual loading through the insertion device.

FIG. 7 shows a form of use of the invention's feed system 1 according to the third embodiment. It can be seen that a workpiece holder 8 with workpieces 3 is positioned on the two insertion devices 18. Also shown is a device 2, here a pallet, from which delivered workpieces 3 are removed and on which workpieces 7 held by the two insertion devices 18 are placed. The feed system 1 shown is also positioned next to another device 2 in the form of a production machine.

Figure 8:
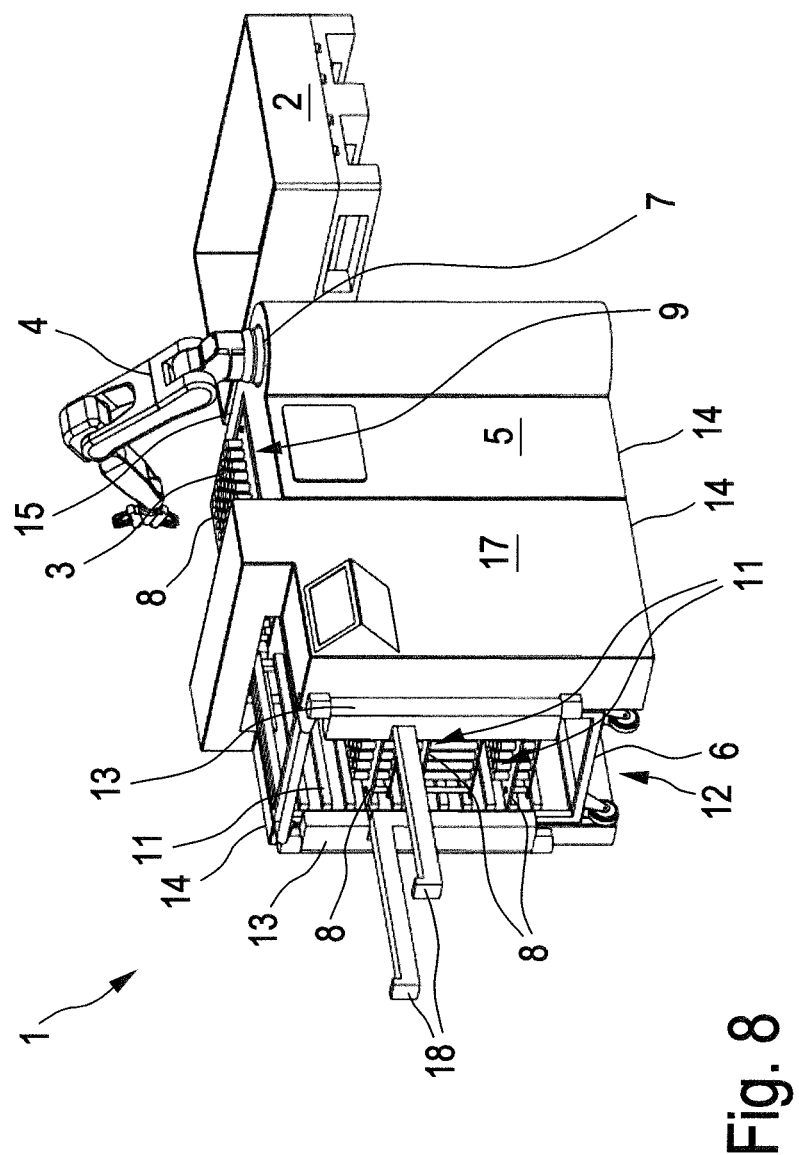
FIG. 8 the third embodiment of the feed system in an alternative form for use.

In FIG. 8 is shown another example of use of the feed system 1. The feed system 1 shown is positioned next to a device 2, here a pallet. Although the feed system 1 depicted represents a feed system of the third embodiment, the example of use shown can also occur with a feed system 1 according to any of the embodiments shown. In FIG. 8 it is shown how workpieces 3 are removed by workpiece holder 8 from their receiving position 9 by the robot 4 mounted on the robot fastening section 7 and placed in the device 2.

Figure 9:
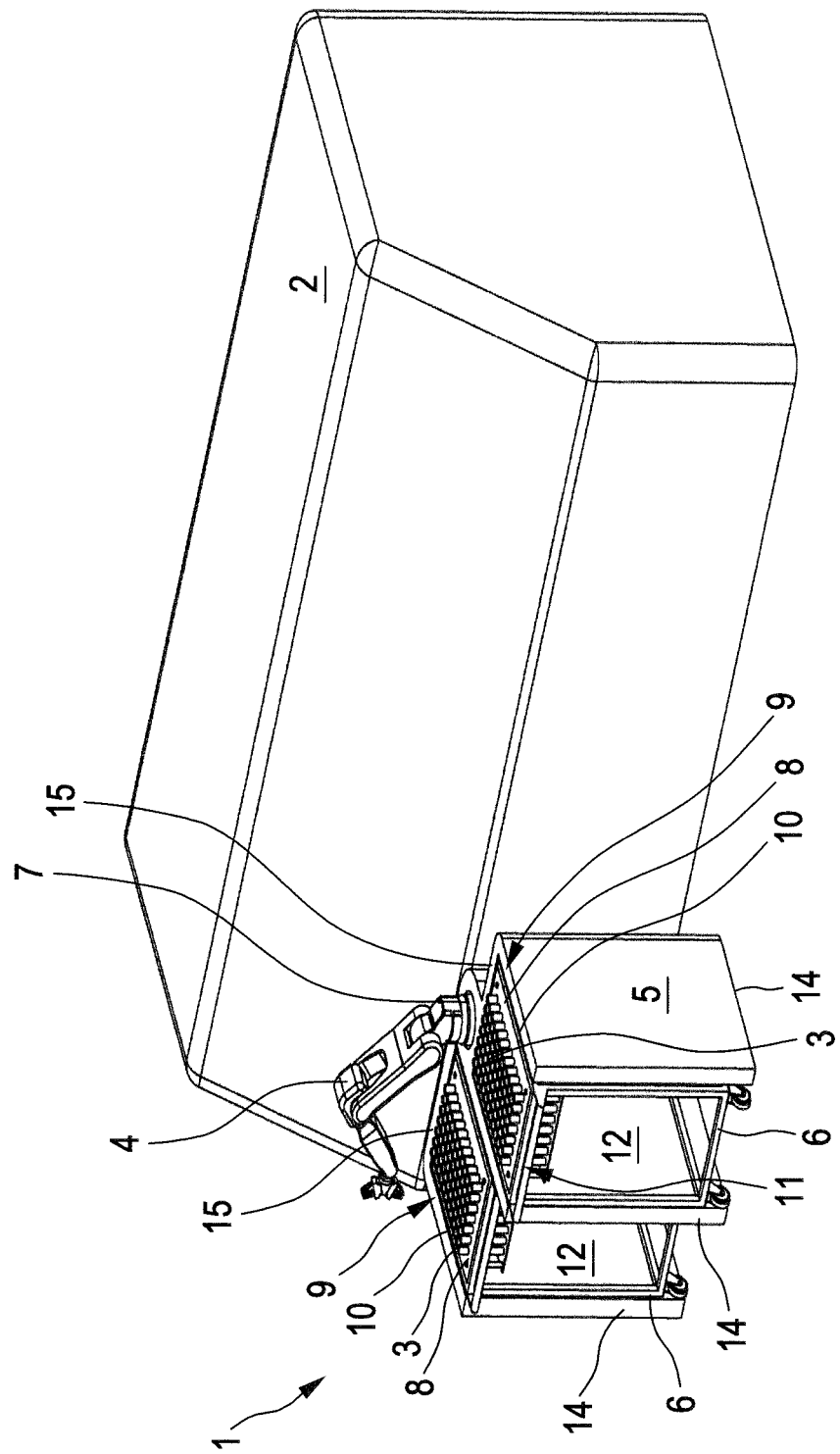
FIG. 9 a fourth embodiment of the feed system with two coupling sections.

In FIG. 9, a feed system is shown in a fourth embodiment. In it the feed system 1 has a feeding station 5 with two coupling sections 12. The feeding station 5 also has a robot fastening section 7 on which a robot 4 is mounted. Each of the two coupling sections 12 is coupled with a transport carriage 6 so that the workpiece holders 8 with workpieces 3 located on the holding devices 10 of transport carriage 6 are each in a receiving position 9 relative to the robot fastening section 7. The feed system 1 is also arranged at a device 2, here a processing machine.

Figure 10:
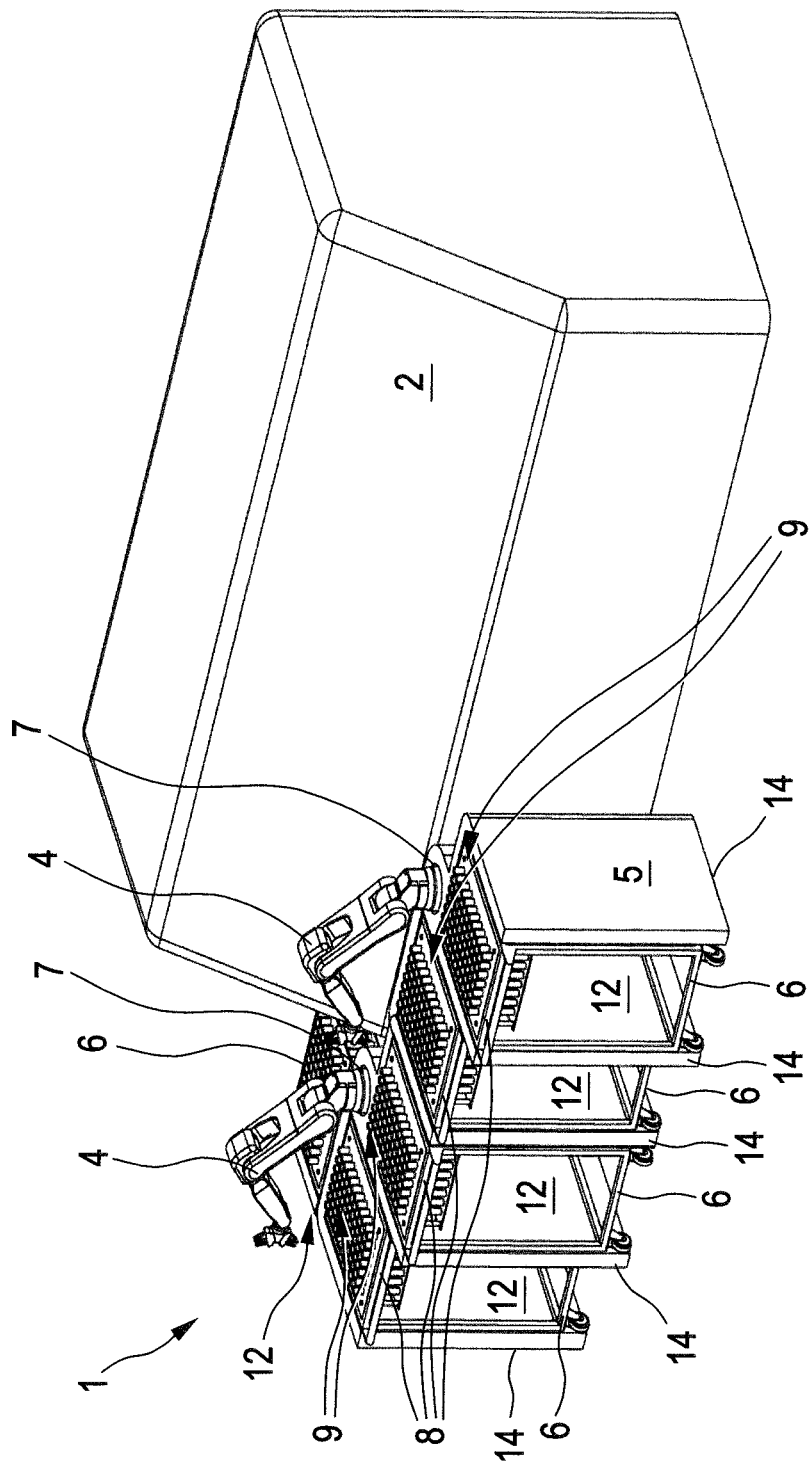
FIG. 10 a fifth embodiment of the feed system with four coupling sections and two robot fastening sections.

FIG. 10 shows a feed system in a fifth embodiment. In it the feeding station 5 comprises four coupling sections 12, wherein with each of the four coupling sections 12 a transport carriage 6 is coupled with workpiece holders 8 and workpieces 3. Another transport carriage 6 is additionally coupled to a lateral, fifth coupling section 12. The fifth embodiment of the feed system also has two robot fastening sections 7, with a robot 4 mounted on each of the two robot fastening sections 7. The robot fastening sections 7 are each positioned between two coupling sections 12, so that two of the four workpiece holders 8 are in a receiving position 9 relative to one of the two robot fastening sections 7. The feed system 1 is also arranged at a device 2.

Figure 11:
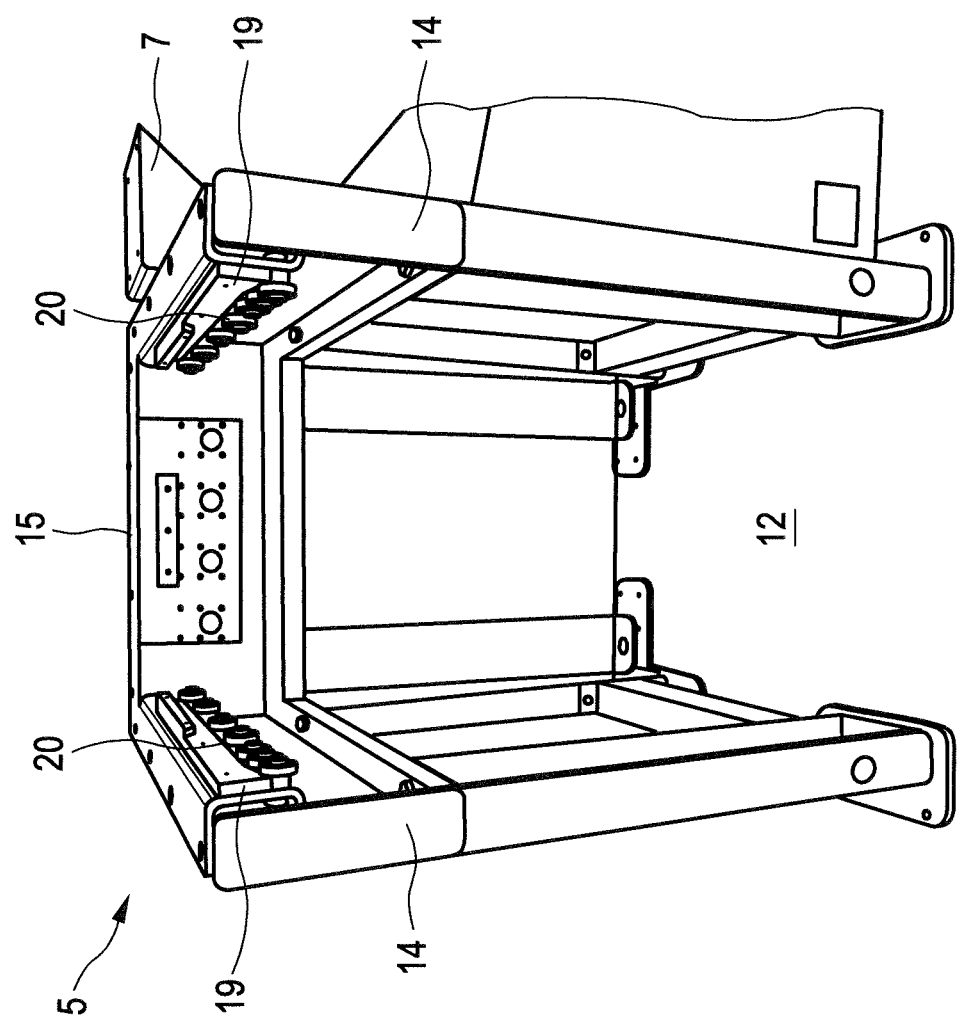
FIG. 11 a perspective view of a feeding station of a feed system according to the first embodiment but without robots.

FIG. 11 shows a feeding station 5 of a feed system 1 according to the first embodiment. The feeding station 5 comprises two lateral guides 14 and one end-side stop 15. The lateral guides 14 and the end-side stop 15 surround the coupling section 12 on three sides. Also shown is the robot fastening section 7. In contrast to the feeding station 5 shown in FIG. 1, no robot 4 is mounted on the robot fastening section 7. Furthermore, on each of the two lateral guides 14 is shown a lateral guide rail 19 and several lateral guide rollers 20. The lateral guides 19 and lateral guide rollers 20 are arranged on the side of the lateral guides 14 facing the coupling section 12.

Figure 12:
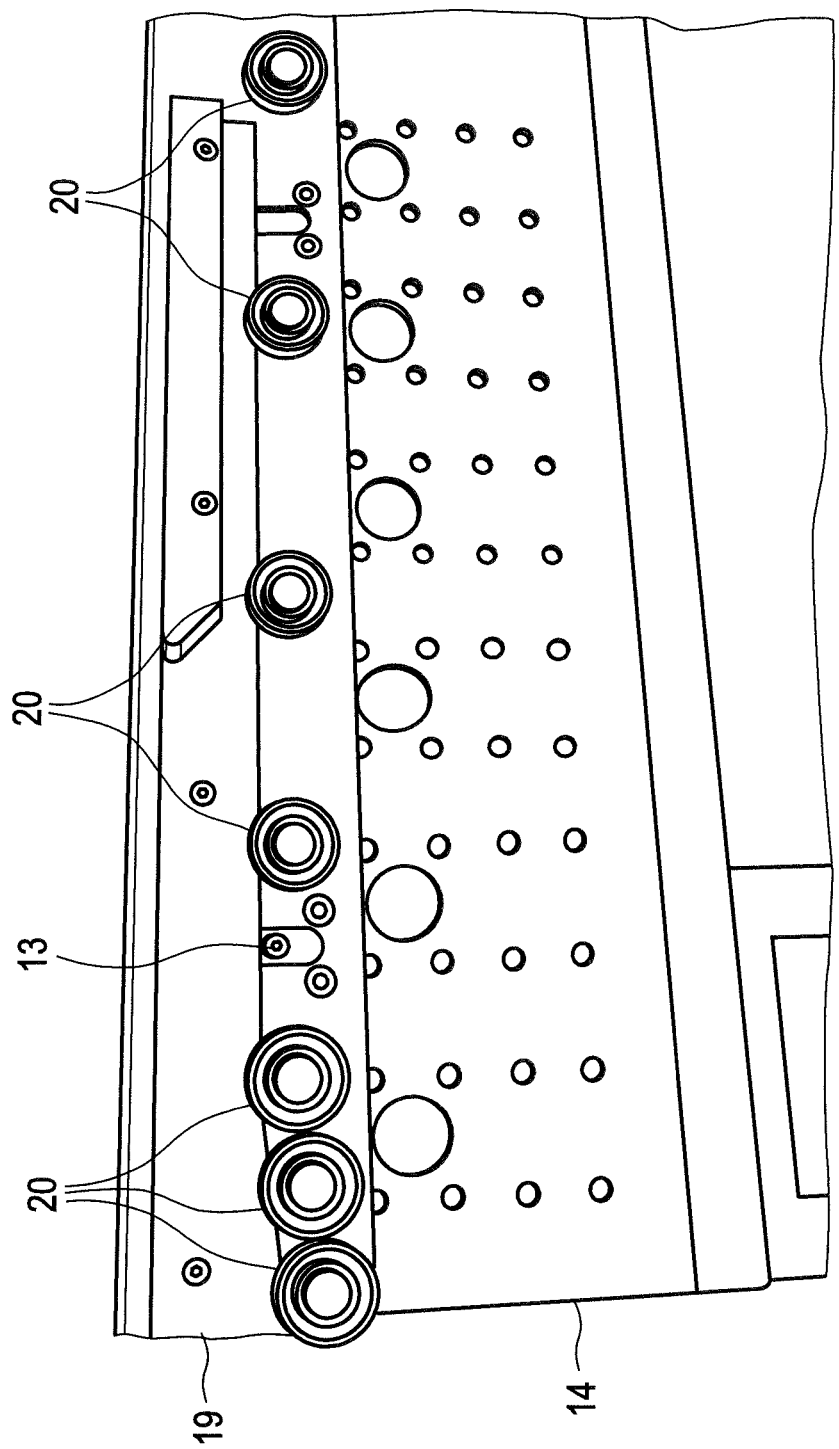
FIG. 12 a detailed view of the lateral guide the feeding station shown in FIG. 11.

FIG. 12 is a detailed view of a lateral guide 14 of the feeding station 5 shown in FIG. 11. Seven lateral guide rollers 20 and one lateral guide rail 19 can be seen on it. Furthermore, the coupling device 13 is shown in the form of a locking cylinder. By moving forward, this can prevent the transport carriage 6 (not shown) from rolling out of the coupling section 12.

In addition, it can be clearly seen in particular in FIG. 12 that the first three guide rollers 20—i.e. the guide rollers farthest from the end-side stop 15—seen in the vertical direction are offset downward relative to the rear four guide rollers 20. In particular, the first three guide rollers 20 are arranged at a slightly ascending angle of preferably a maximum 10°. Through this arrangement the transport carriage 6 is raised from the bottom when it is brought into the coupling section 12. This can guarantee that the workpieces 3 arranged on the transport carriage 6 are always at the same height and an undesired height difference does not occur due to, for example, metal pieces or waste located on the bottom.

REFERENCE NUMERAL LIST

1. Feed system
2. Device
3. Workpiece
4. Robot
5. Feeding station
6. Transport carriage
7. Robot fastening section
8. Workpiece holder
9. Receiving position
10. Holding device
11. Holding position
12. Coupling section
13. Coupling device
14. Lateral guide
15. End-side stop
16. Loading device
17. Load module
18. Insertion device
19. Lateral guide rail
20. Lateral guide roller

The invention claimed is:

1. A feed system for feeding a device with workpieces by means of a robot,
   wherein the feed system comprises a feeding station and at least one transport carriage, wherein the feeding station comprises a robot fastening section and is designed in such a way that a workpiece holder can be reproducibly held in it unmovably in a receiving position defined relative to the robot fastening section from which a robot mounted to the robot fastening section can grasp the workpieces,
   wherein the transport carriage comprises at least one holding device for holding the workpiece holder in a holding position,
   wherein the feeding station comprises a loading device with which the workpiece holder can be brought indirectly from the holding position into the receiving position in the feeding station,
   wherein the loading device is configured to remove the workpiece holder from the transport carriage and transport the workpiece holder to the receiving position, the loading device being designed such that it can push and/or pull the workpiece holder and the feeding station comprises a coupling section through which the transport carriage can be coupled with the aid of a coupling device with the feeding station such that the workpiece holder held in the transport carriage in the holding position after the coupling of the transport carriage with the coupling section has been brought into the receiving position with a horizontal and/or vertical movement of the workpiece holder.

2. The feed system according to claim 1, wherein the coupling section comprises at least one lateral guide for the transport carriage.

3. The feed system according to claim 2, wherein the at least one lateral guide comprises at least one lateral guide rail and/or at least one lateral guide roller.

4. The feed system according to claim 1, wherein the coupling section comprises at least one end-side stop.

5. The feed system according to claim 1, wherein the coupling device is provided on the coupling section of the feeding station and/or on the transport carriage.

6. The feed system according to claim 1, wherein the transport carriage comprises a plurality of holding devices arranged at different heights of the transport carriage for holding workpiece holders in different holding positions in the transport carriage.

7. The feed system according to claim 1, wherein the loading device is designed as an independent load module that can be mounted on the feeding station.

8. The feed system according to claim 7, wherein the independent load module comprises the coupling section for coupling of a transport carriage.

9. The feed system according to claim 1, wherein the feeding station comprises a plurality of coupling sections.

10. The feed system according to claim 1, wherein the feeding station comprises at least one more robot fastening section, each suitable for fastening another robot.

11. The feed system according to claim 1, wherein the coupling section comprises an insertion device for workpiece holders.

12. Use of a feed system according to claim 1 for feeding a device.

13. A method for feeding a device with workpieces by means of a robot, by means of a feed system, wherein the feed system comprises a feeding station and at least one transport carriage, wherein the feeding station comprises a robot fastening section and is designed in such a way that a workpiece holder can be reproducibly held in it unmovably in a receiving position defined relative to the robot fastening section from which a robot mounted to the robot fastening section can grasp the workpieces, wherein the transport carriage comprises at least one holding device for holding the workpiece holder in a holding position, wherein the feeding station comprises a loading device with which the workpiece holder can be brought indirectly from the holding position into the receiving position in the feeding station, wherein the loading device is configured to remove the workpiece holder from the trans port carriage and transport the workpiece holder to the receiving position, the loading device being designed such that it can push and/or pull the workpiece holder and the feeding station comprises a coupling section through which the transport carriage can be coupled with the aid of a coupling device with the feeding station such that the workpiece holder held in the transport carriage in the holding position after the coupling of the transport carriage with the coupling section has been brought into the receiving position with a horizontal and/or vertical movement of the workpiece holder, the method comprising the following procedural steps: a) loading the transport carriage with at least one workpiece holder and with at least one workpiece, b) moving the transport carriage to the feeding station, c) coupling the transport carriage with the coupling section of the feeding station, and d) after the coupling in procedural step c) the at least one workpiece is removed by the robot and the device is thereby fed by the robot, wherein the method takes place with interposition of a movement of at least one workpiece holder from the holding position to the receiving position by a loading device.

14. The method according to claim 13, wherein the procedural step a) in a further feeding station is done by a robot and/or manually.

15. A method according to claim 13, wherein the method is performed in a reverse order to the feeding of the transport carriage.

* * * * *